United States Patent
Fujiya et al.

(10) Patent No.: US 9,791,830 B2
(45) Date of Patent: Oct. 17, 2017

(54) DUCT THAT IS DETACHABLE TO A MAIN BODY, AND A MAIN BODY INCLUDING A DUCT AND A DETACHABLE DEVICE

(71) Applicants: Hiromitsu Fujiya, Kanagawa (JP); Tomoaki Suga, Kanagawa (JP)

(72) Inventors: Hiromitsu Fujiya, Kanagawa (JP); Tomoaki Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/132,961

(22) Filed: Apr. 19, 2016

(65) Prior Publication Data
US 2016/0313693 A1 Oct. 27, 2016

(30) Foreign Application Priority Data
Apr. 22, 2015 (JP) .................. 2015-087538

(51) Int. Cl.
*G03G 21/20* (2006.01)
*H04N 1/00* (2006.01)
*H04N 1/04* (2006.01)

(52) U.S. Cl.
CPC ....... *G03G 21/206* (2013.01); *H04N 1/00519* (2013.01); *H04N 1/04* (2013.01); *H04N 2201/0094* (2013.01)

(58) Field of Classification Search
CPC ... F24F 13/0218; H04N 1/00519; H04N 1/04; G03G 21/206
USPC ................................................ 399/92
See application file for complete search history.

(56) References Cited

U.S. PATENT DOCUMENTS

| | | | |
|---|---|---|---|
| 2002/0085855 A1* | 7/2002 | Baughman | G03G 21/206 399/92 |
| 2007/0146739 A1* | 6/2007 | Igarashi | G03G 21/206 358/1.7 |
| 2011/0262174 A1* | 10/2011 | Gumbe | G03G 15/0898 399/92 |
| 2014/0199091 A1* | 7/2014 | Azeyanagi | G03G 21/1647 399/92 |
| 2015/0071677 A1 | 3/2015 | Hirasawa et al. | |

FOREIGN PATENT DOCUMENTS

JP 3309636 7/2002
JP 2004-219487 8/2004

\* cited by examiner

*Primary Examiner* — Sandra Brase
(74) *Attorney, Agent, or Firm* — Oblon, McClelland, Maier & Neustadt, L.L.P.

(57) ABSTRACT

A duct that is attachable to a main body includes a flow passage to flow air, the flow passage including a flexible structure, and a ventilation opening at a first end of the flow passage. The ventilation opening and at least a part of flow passage are passable through a recess of a detachable device which detachable from the main body. A main body including the duct, the detachable device, and an airflow generation device is also provided.

20 Claims, 15 Drawing Sheets

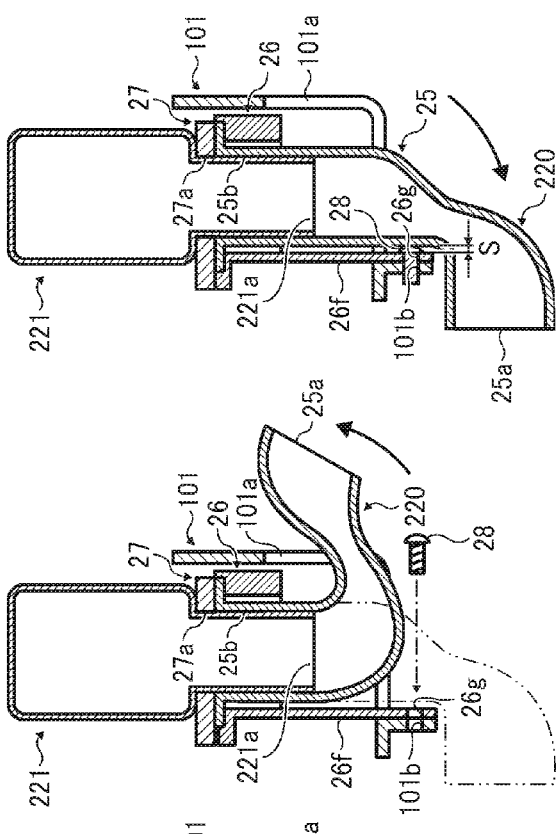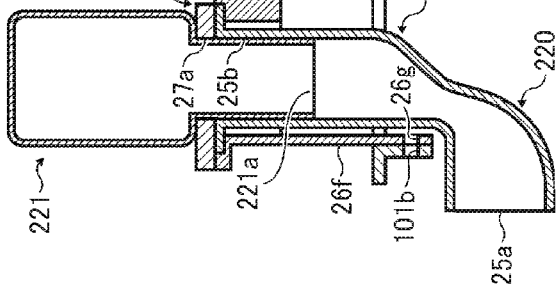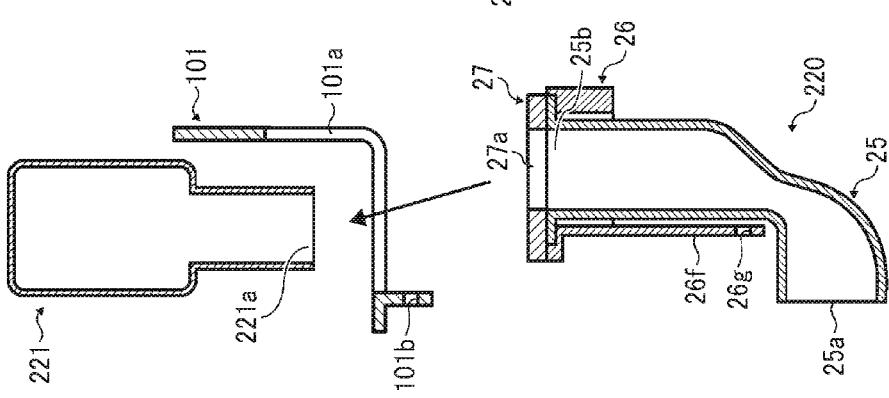

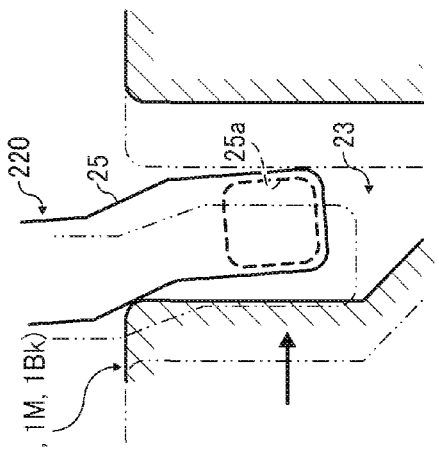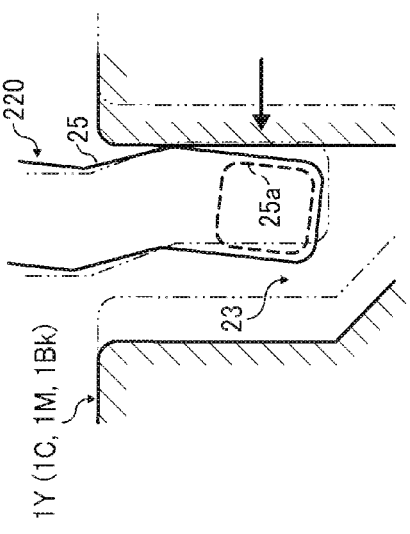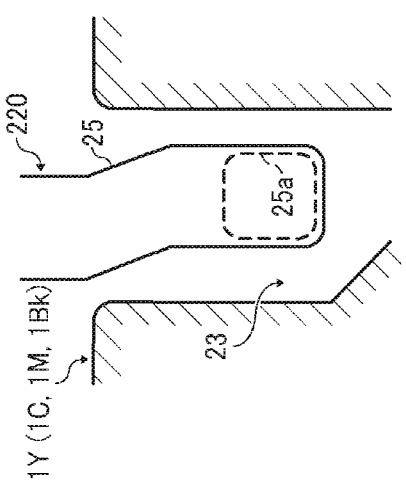

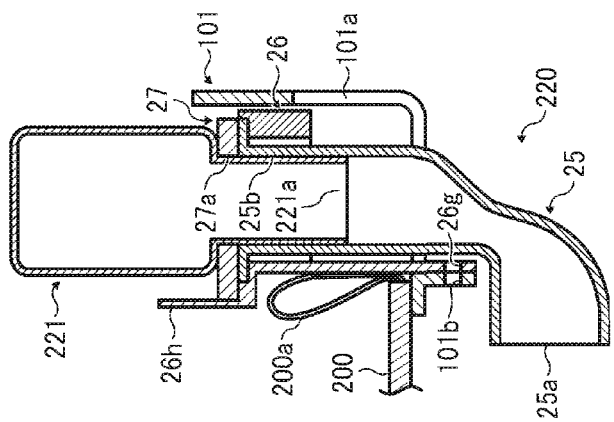
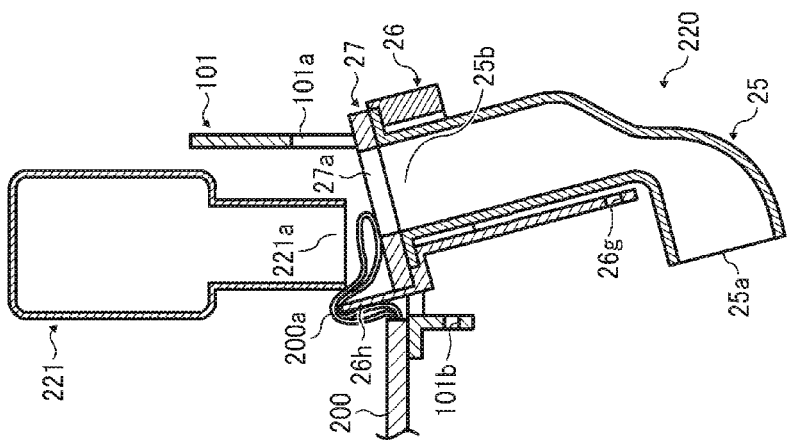
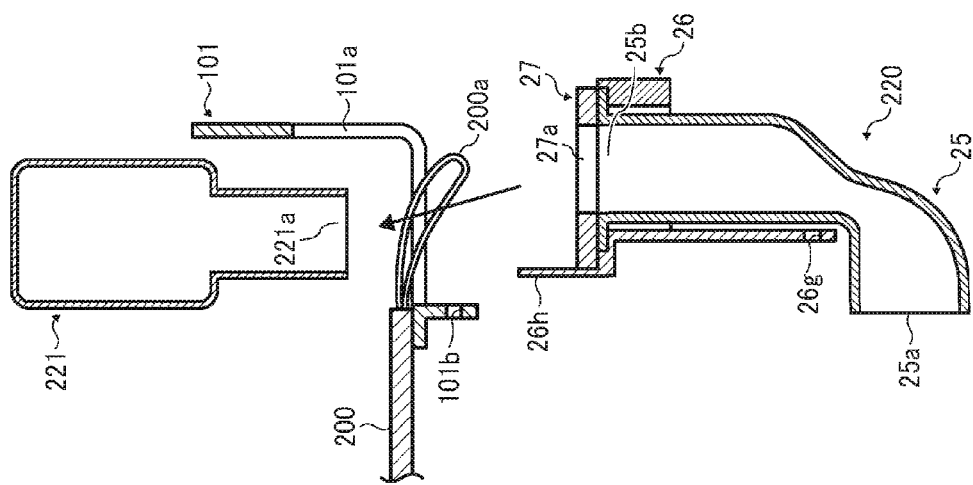

DUCT THAT IS DETACHABLE TO A MAIN BODY, AND A MAIN BODY INCLUDING A DUCT AND A DETACHABLE DEVICE

CROSS-REFERENCE TO RELATED APPLICATIONS

This patent application is based on and claims priority pursuant to 35 U.S.C. §119(a) to Japanese Patent Application No. 2015-087538, filed on Apr. 22, 2015, in the Japan Patent Office, the entire contents of which are hereby incorporated by reference herein.

BACKGROUND

Technical Field

Embodiments of the present application generally relate to a ventilation duct and an image forming apparatus, such as, a copier, a printer, a facsimile machine, a plotter, or a multifunction peripheral (i.e., multifunction machine or MPF) having at least two of copying, printing, facsimile transmission, plotting, and scanning capabilities, that includes a toner conveyance device.

Description of the Related Art

In image forming apparatuses, such as printers, copiers, facsimile machines, and MFPs having those capabilities, typically, it is known that ozone is generated when a photoconductor as an image bearer is charged by a charging device. A discharge product is formed by reacting the ozone with moisture in air. Attaching the discharge product to a surface of the photoconductor causes an image forming failure. Thereby, it has been carried out that the generated ozone and the discharging product discharge to outside of the image forming apparatus.

More specifically, a typical image forming apparatus includes a duct to suck the generated ozone and to discharge it to outside of the image forming apparatus. In this structure, in order to enhance the maintainability, a part of the duct is disposed above a marking module that is removable relative to the image forming apparatus. Thereby, it is possible to separate a module side duct from the image forming apparatus side duct by removing the marking module.

SUMMARY

An embodiment of the present application provides a duct that is detachable from a main body, the duct includes a flow passage to flow air, the flow passage including a flexible structure, and a ventilation opening at a first end of the flow passage. The ventilation opening and at least a part of the flow passage are passable through a recess of a detachable device which is detachable from the main body.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 10A to 10D are schematic views of an attaching process of the end side flow passage;

FIGS. 13A to 13C are schematic views in a state in which the end side flow passage has no contact with an inner surface of a concave portion of the image forming unit;

FIGS. 20A to 20C are schematic views of the attaching process of the end side flow passage illustrated in FIG. 18.

DETAILED DESCRIPTION

Figure 1:
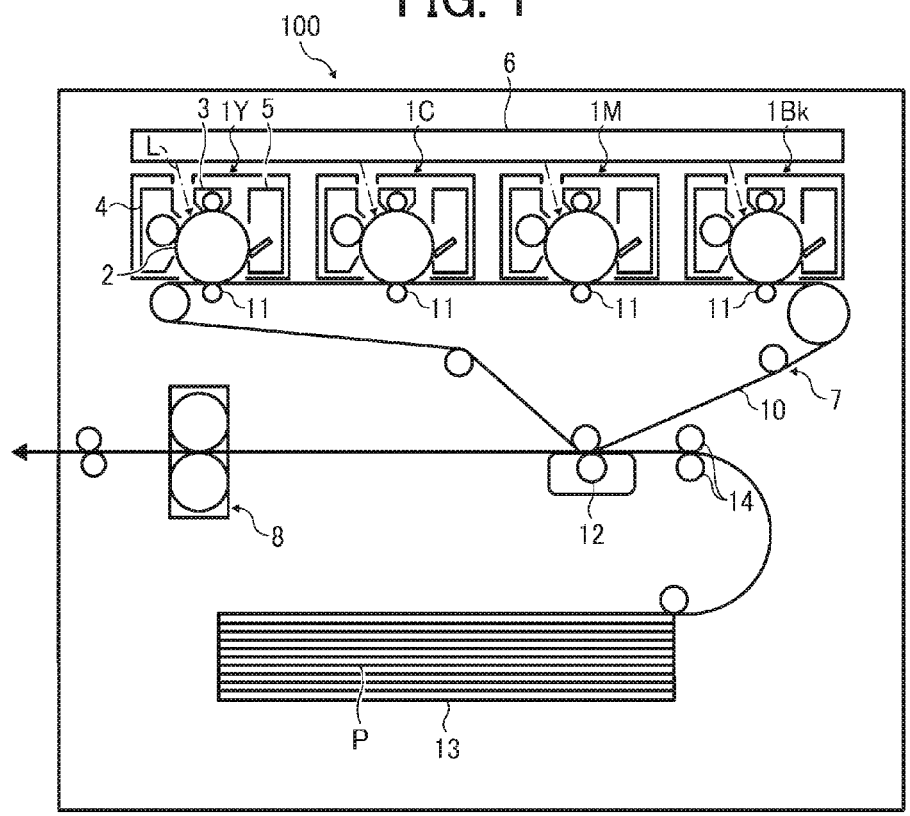
FIG. 1 is a schematic view of an image forming apparatus according to an embodiment of the present application.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In the image forming apparatus which includes a duct to suck generated ozone and to discharge it to outside of the image forming apparatus, when the duct is disposed above the marking module, it is possible that a whole height of the marking module including duct is enlarged.

According to embodiment described below, at least a part of the duct is disposed in a concave portion of a removable unit, and the concave portion is utilized effectively as an installation space of the duct, thereby it is possible to attain miniaturization.

Referring now to the drawings, wherein like reference numerals designate identical or corresponding parts throughout the several views thereof, and particularly to FIG. 1, a multicolor image forming apparatus according to an embodiment of the present application is described. The image forming apparatus may be a copier, a printer, a facsimile machine, a plotter, or a multifunction peripheral (i.e., multifunction machine or MFP) having at least two of copying, printing, facsimile transmission, plotting, and scanning capabilities, or the like. According to this embodiment, the image forming apparatus is a tandem color printer that forms color and monochrome toner images on recording media by electrophotography, alternatively, this embodiment is also applicable to a monochrome image forming apparatus which forms a monochrome image.

The image forming apparatus 100 includes four image forming units 1Y, 1C, 1M, and 1Bk (hereinafter collectively referred to as image forming units 1), each forming an image of a specified color, that is, yellow (Y), cyan (C), magenta (M), or black (K). It is to be noted that, each of the four image forming units 1 has the same basic configuration, differing only in the color of toner used.

The image forming units 1 each include a latent image carrier, which, in illustrative embodiments, is a photoconductor 2, a charger 3 that charges a surface of the respective photoconductor 2, a developing device 4 that for is toner images on the surface of the respective photoconductor 2, and a cleaning device 5 that cleans the surface of the respective photoconductor 2. In FIG. 1, the photoconductor 2, the charger 3, the developing device 4, and the cleaning device 5 are shown in the yellow image forming unit 1Y, and are omitted from being labeled in the other image forming units 1C, 1M, and 1Bk.

The image forming apparatus 100 further includes a writing device 6 above the image forming units 1Y, 1C, 1M, and 1Bk that respectively form electrostatic latent images on the charged surfaces of the photoconductors 2. On the other hand, a transfer device 7 is disposed below the image forming units 1. The transfer device 7 includes an intermediate transfer belt 10 composed of an endless belt, multiple primary transfer rollers 11 each as a primary transfer device which primarily transfers the image on the photoconductor 2 to the intermediate transfer belt 10 and a secondary transfer roller 12 as a secondary transfer device which secondarily transfers the image transferred to the intermediate transfer belt 10 to a recording medium.

The intermediate transfer belt 10 is stretched by multiple support rollers, one of which is a drive roller. The intermediate transfer belt 10 is rotated by rotation of the drive roller.

Each primary transfer roller 11 is disposed so as to contact the respective photoconductor 2 via the intermediate transfer belt 10 that is interposed therebetween. A primary transfer nip which the image on each photoconductor 2 is transferred to the intermediate transfer belt 10 is formed at a contact portion between the primary transfer rollers 11 and the photoconductors 2 via the intermediate transfer belt 10.

The secondary transfer roller 12 is disposed so as to contact one of the multiple support rollers via the intermediate transfer belt 10 interposed therebetween. A secondary transfer nip which the image on the intermediate transfer belt 10 is transferred to the recording medium is formed at a contact portion between the secondary transfer roller 12 and the one of the multiple support rollers via the intermediate transfer belt 10.

The image forming apparatus 100 further includes a sheet feeder 13 that supplies a recording medium P such as a sheet of paper or an overhead projector (OHP) sheet to the secondary transfer nip, a pair of registration rollers 14 that adjusts a timing to convey the recording medium P fed from the sheet feeder 13 to the secondary transfer nip, and a fixing device 8 that fixes a toner image onto the recording medium P.

A description is now given of operations of the image forming apparatus 100. At the start of image formation, the photoconductors 2 are rotatively driven so that the chargers 3 evenly charge the surfaces of the photoconductors 2 to a predetermined polarity, respectively. Next, the writing device 6 irradiates laser light onto the charged surfaces of the photoconductors 2, respectively, based on image data of a document read by a reading device so that electrostatic latent images are formed on the surfaces of the photoconductors 2, respectively. At this time, the writing device 6 writes image data of a single color, which is obtained by separating a full-color image to be formed into color data of yellow (Y), cyan (C), magenta (M), and black (K), onto the surface of each of the photoconductors 2, respectively. The developing devices 4 supply toner of the specified color to the electrostatic latent images formed on the surfaces of the photoconductors 2, respectively, so that toner images of the respective colors are formed on the surfaces of the photoconductors 2.

The toner images formed on the surfaces of the photoconductors 2 are sequentially transferred onto the intermediate transfer belt 10 at the respective primary transfer nip by transfer electrical fields which are formed by applying a predetermine voltage to the intermediate transfer belt 10. Thus the intermediate transfer belt 10 bears the full-color toner images on the surface thereof. Untransferred toner remaining on the surfaces of the photoconductors 2 is removed by the cleaning devices 5, respectively.

Also at the start of image formation, the recording medium P is fed from the sheet feeder 13. Conveyance of the recording medium P fed from the sheet feeder 13 is temporarily stopped by the pair of registration rollers 14. Thereafter, the pair of registration rollers 14 conveys the recording medium P to the secondary transfer nip formed between the secondary transfer roller 12 and the intermediate transfer belt 10 in synchronization with the full-color toner image formed on the intermediate transfer belt 10. A transfer voltage having a polarity opposite the charging polarity of toner in the full-color toner image formed on the intermediate transfer belt 10 is supplied to the secondary transfer roller 12 so that a transfer electrical field is formed at the secondary transfer nip.

Accordingly, the full-color toner image formed on the intermediate transfer belt 10 is secondarily transferred onto the recording medium P by the transfer electrical field formed at the secondary transfer nip. The recording medium P having the full-color toner image thereon is then conveyed to the fixing device 8 so that the full-color toner image is fixed onto the recording medium P. Thereafter, the recording medium P having the fixed image thereon is discharged to a discharge tray.

Although full-color image formation is described in the above example, alternatively, a monochrome image may be formed using only one of the image forming units 1 or a two- or three-colored image may be formed using two or three of the image forming units 1 in the image forming apparatus 100.

Figure 2:
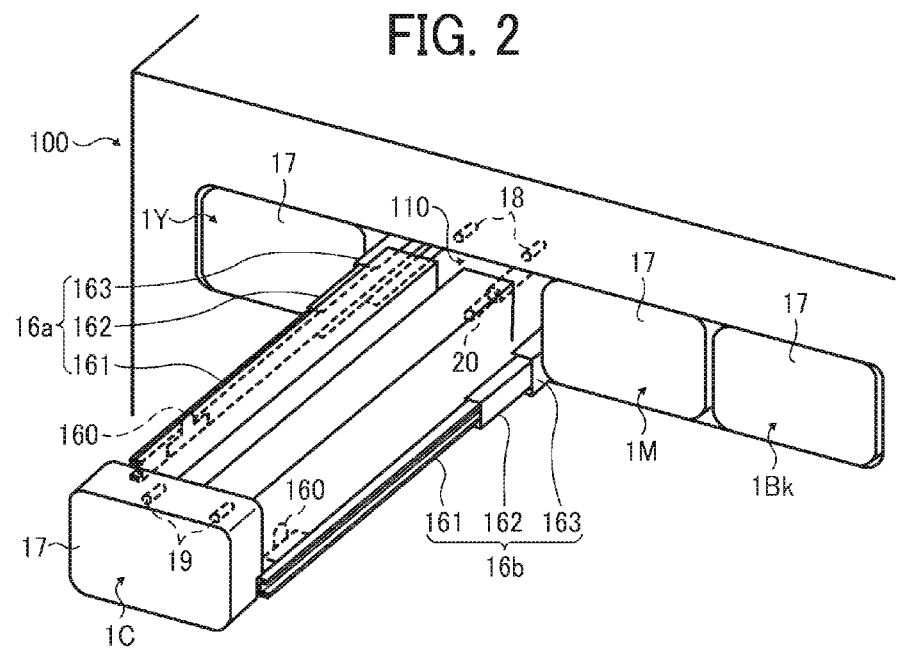
FIG. 2 is a schematic view in a state in which an image forming unit is pulled out from the image forming apparatus.

FIG. 2 shows a state in which one of the image forming units 1Y, 1C, 1M, and 1Bk is pulled out from the image forming apparatus 100. In FIG. 2, although the cyan image forming unit 1C is only pulled out from an apparatus main body to a front side, the other image forming units 1Y, 1M, and 1Bk are also provided detachably (i.e., removably). Thus each of the image forming units 1Y, 1C, 1M, and 1Bk are provided as a detachable unit (i.e., removable unit) which is detachable (removable) from the apparatus main body of the image forming apparatus 100.

Each of the image forming units 1Y, 1C, 1M, and 1Bk is provided as a longitudinal type extending in an axial direction of the photoconductor 2, and is detachable in the longitudinal direction. More specifically, each of the image forming units 1Y, 1C, 1M, and 1Bk is supported detachably by a pair of guide rails 16a, 16b which are parallel to each other and provided at the apparatus main body. Each of the guide rails 16a, 16b includes a plurality of guide rail members 161, 162, and 163 which are slidably connected in the longitudinal direction. The guide rails 16a, 16b are extendable between a front side and a rear side viewed from a front side of the apparatus main body (front side in FIG. 2). In this embodiment, one of the guide rails 16a (left side in FIG. 2) is disposed so as to support an upper part of a left side of the image forming unit 1C, another guide rail 16b (right side in FIG. 2) is disposed so as to support a lower part of a right side of the image forming unit 1C.

Figure 3:
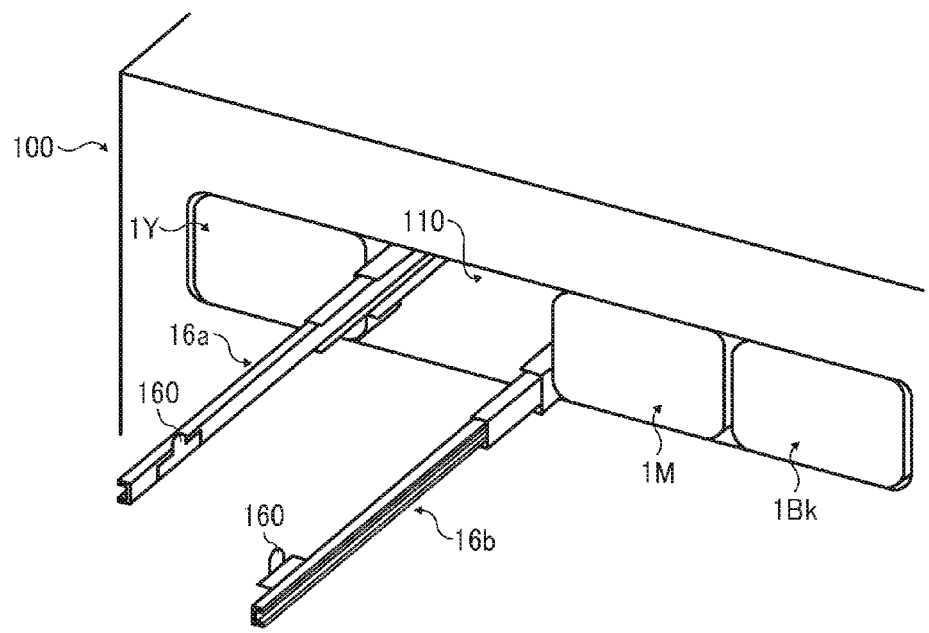
FIG. 3 is a schematic view in a state in which the image forming unit is detached from a guide rail.

Each of the image forming units 1Y, 1C, 1M, and 1Bk is detachable from the guide rails 16a, 16b. Referring to FIG. 2, the image forming unit 1C is detachable from the guide rails 16a, 16b when the image forming unit 1C is lifted upward in a state in which the image forming unit 1C is completely pulled out from the apparatus main body. FIG. 3 shows the state in which the image forming unit 1C is detached from the guide rails 16a, 16b. In this embodiment, each of the image forming units 1Y, 1C, 1M, and 1Bk includes a cover member 17 which composes a part of an exterior of the apparatus main body in a state in which the image forming units 1Y, 1C, 1M, and 1Bk are inserted into to the apparatus main body. Each of the image forming units 1Y, 1C, 1M, and 1Bk is detachable from the apparatus main body integrated with the respective cover member 17.

The guide rails 16a, 16b each include a convex engaging part 160 which is engaged with the image forming unit 1Y, 1C, 1M, and 1Bk in the inserted state to the apparatus main body. When each of the image forming units 1Y, 1C, 1M, and 1Bk is attached to the guide rails 16a, 16b, an engaged port of the image forming unit 1Y, 1C, 1M, and 1Bk is positioned so as to engage with the convex engaging part 160, and each of the image forming units 1Y, 1C, 1M, and 1Bk is mounted on the guide rails 16a, 16b. In this state, by pushing the image forming units 1Y, 1C, 1M, and 1Bk into the rear side of the apparatus main body, it is possible to insert image forming units 1Y, 1C, 1M, and 1Bk into the apparatus main body.

The positioning of the image forming units 1Y, 1C, 1M, and 1Bk to the apparatus main body is carried out by engaging a positioning convex 18 as a positioning member at the front side of the apparatus main body with a positioning concave 19 as a positioning member at the cover member 17 of the image forming units 1Y, 1C, 1M, and 1Bk. In this case, each of the image forming units 1Y, 1C, 1M, and 1Bk is positioned in an up-and-down direction and a right-and-left direction by inserting the positioning convex 18 into the positioning concave 19 when each of the image forming units 1Y, 1C, 1M, and 1Bk is attached to the apparatus main body.

Referring to FIG. 2, the image forming apparatus 100 includes a guide shaft 20 which inserts into a rotary axis of the photoconductor 2. Since the rotary axis of the photoconductor 2 comprises a hollow axis, the photoconductor 2 is guided in the insertion direction by inserting the guide shaft 20 into a hole of the rotary axis of the photoconductor 2 when each of the image forming units 1Y, 1C, 1M, and 1Bk is attached to the apparatus main body.

Figure 4:
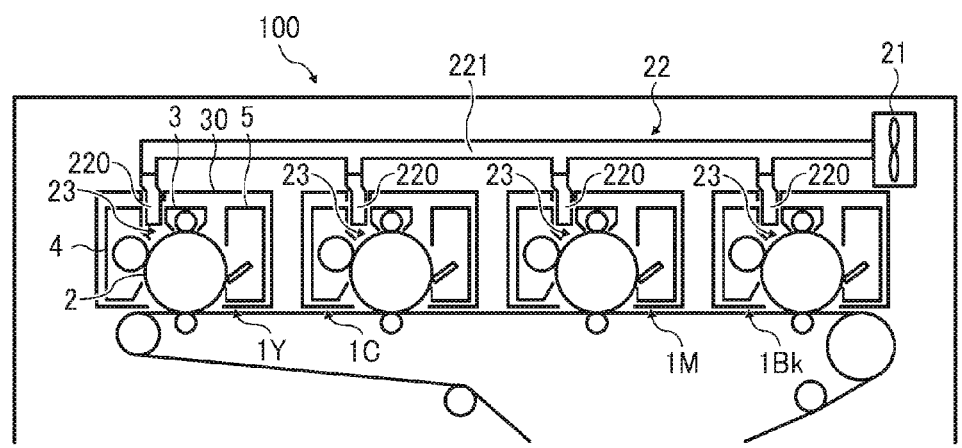
FIG. 4 is a schematic view of an arrangement of a blower fan and a duct.

Referring to FIG. 4, the image forming apparatus 100 includes a blower fan 21 as an airflow generation means and a duct 22 which guides the airflow generated by the blower fan 21 to each of the image forming units 1Y, 1C, 1M, and 1Bk. The duct 22 is branched into four sections in order to guide air blown from the blower fan 21 to each of the image forming units 1Y, 1C, 1M, and 1Bk. An end side flow passage 220 as a flow passage at a branched section is disposed corresponding to each of the image forming units 1Y, 1C, 1M, and 1Bk. In addition, the end side flow passage 220 inserts into a recess portion 23 at a housing 30 of each of the image forming units 1Y, 1C, 1M, and 1Bk. The end side flow passage 220 is disposed above the photoconductor 2 and near the charger 3. The recess portion 23, which is arranged so that the end side flow passage 220 inserts therein, is recessed from an outer surface of the housing 30 to an inner side of the housing 30 which holds the photoconductor 2, the charger 3, the developing device 4, and the cleaning device 5 provided in the image forming units 1Y, 1C, 1M, and 1Bk. The recess portion 23 is provided to be irradiated with laser light from the writing device 6 onto the photoconductor 2.

Figure 5:
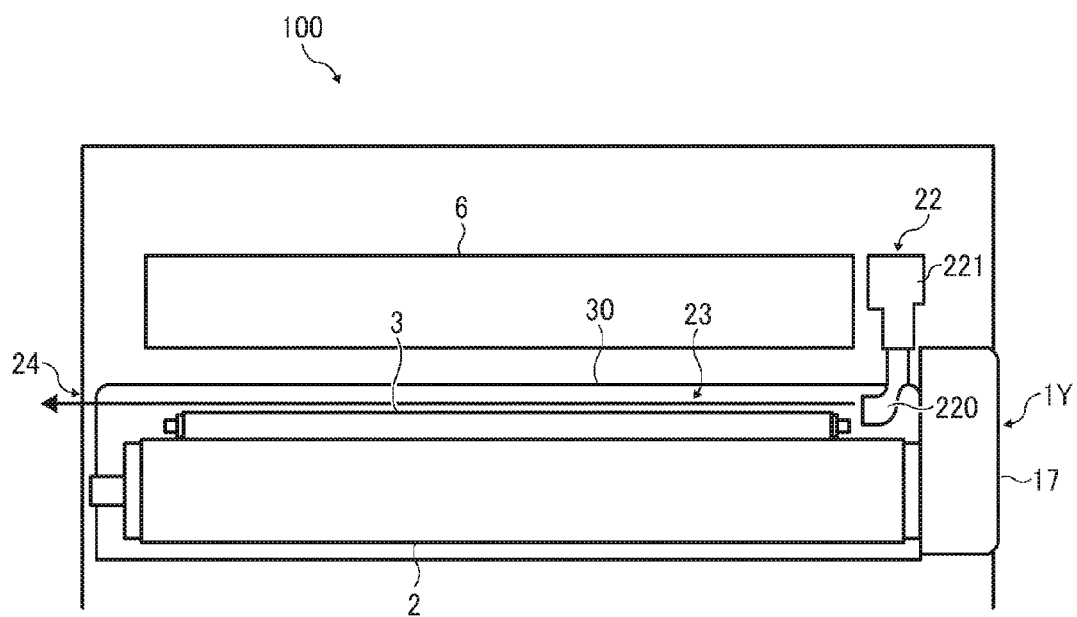
FIG. 5 is a schematic view illustrating an air current discharged from the duct.

Referring to FIG. 5, the whole duct 22 is arranged at the front side (right side in FIG. 5) of the image forming apparatus. The duct 22 includes the end side flow passage 220 and a body side flow passage 221 connected to the end side flow passage 220. When the blower fan 21 is driven in the state in which the image forming units 1Y, 1C, 1M, and 1Bk are attached to the apparatus main body, the generated airflow is guided into each of the image forming units 1Y, 1C, 1M, and 1Bk through the duct 22, the air is discharged from the end side flow passage 220 in an arrow direction in FIG. 5. In this case, the air discharged from the end side flow passage 220 flows from the front side to the rear side of the apparatus main body (i.e., the insertion direction of the image forming unit) above the photoconductor 2 along its axial direction. The image forming apparatus 100 further includes a vent hole 24 at the rear side of the apparatus main body, and the air is discharged through the vent hole 24.

In the above description, by flowing the air above the photoconductor 2 along its axial direction, it is possible to discharge the ozone and the discharge product generated by charging the photoconductor 2 to the outside of the apparatus main body, and to suppress an adherence of the discharge product to the photoconductor 2. Thereby, it is possible to prevent an image defect and to obtain excellent images over a long period. Although FIG. 5 shows the air flow generated at the yellow image forming unit 1Y, the air flow is similarly generated at the other image forming units 1C, 1M, and 1Bk.

In this embodiment, the ozone and so on is removed from a periphery of the photoconductor 2 by discharging air from the duct 22. On the contrary, it is possible to remove the ozone and so on by sucking air into the duct 22. A suction fan may be provided outside of the vent hole 24 at the apparatus main body. Thereby, it is certainly possible to generate the air flow by cooperating the suction fan with the blower fan 21. Another duct including a fan or a filter may be provided outside of the vent hole 24. Thereby, the ozone and its discharge products are removed by the filter, and it is possible to discharge cleaned air to outside of the apparatus main body.

In the above description, although the end side flow passage 220 of the duet 22 is arranged corresponding to each of the image forming units 1Y, 1C, 1M, and 1Bk, these end side flow passages 220 are detachable (i.e., removable). In other words, the flow passage for guiding the air flow in the duct 22 includes the body side flow passage 221 at the apparatus main body and the end side flow passage 220 that is detachably attached to the body side flow passage 221.

The structure of the duct 22 in this embodiment is described in detail below. In addition, since each of the end side flow passages 220 and each portion to which the end side flow passages 220 are attached have similar structure, one of the end side flow passages 220 and one of the portions to which the one of the end side flow passages 220 is attached are described.

Figure 6A:
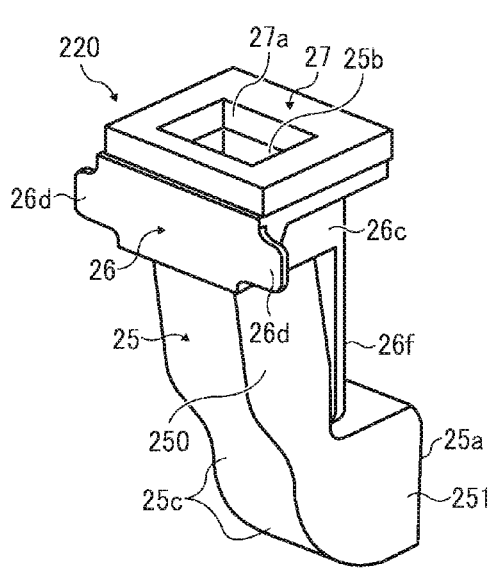
FIGS. 6A to 6D are schematic views of an end side flow passage of the duct.
Figure 6B:
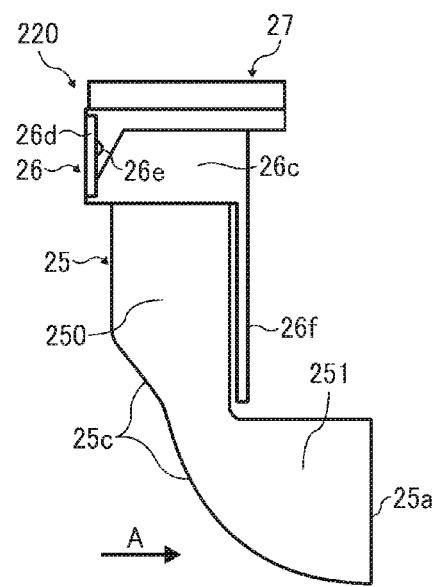
Figure 6C:
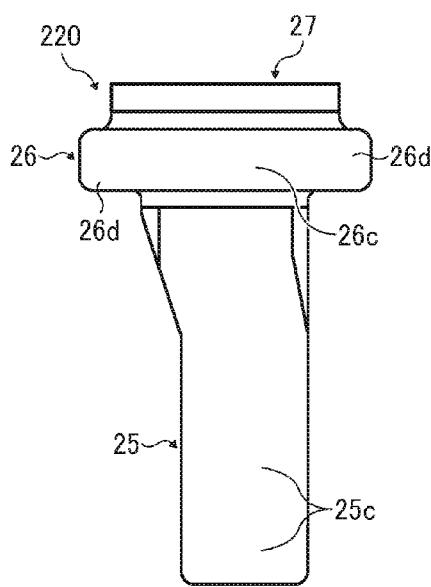
Figure 6D:
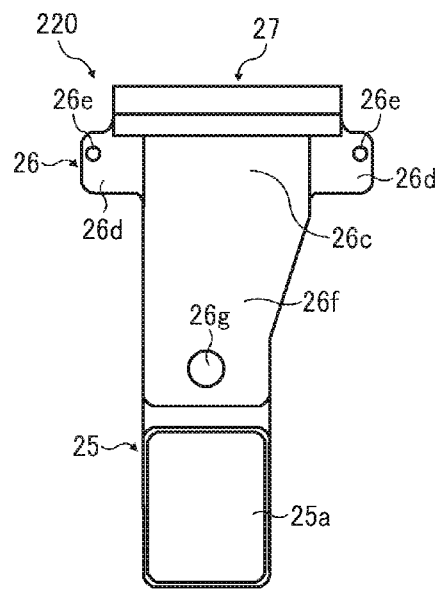
Figure 7:
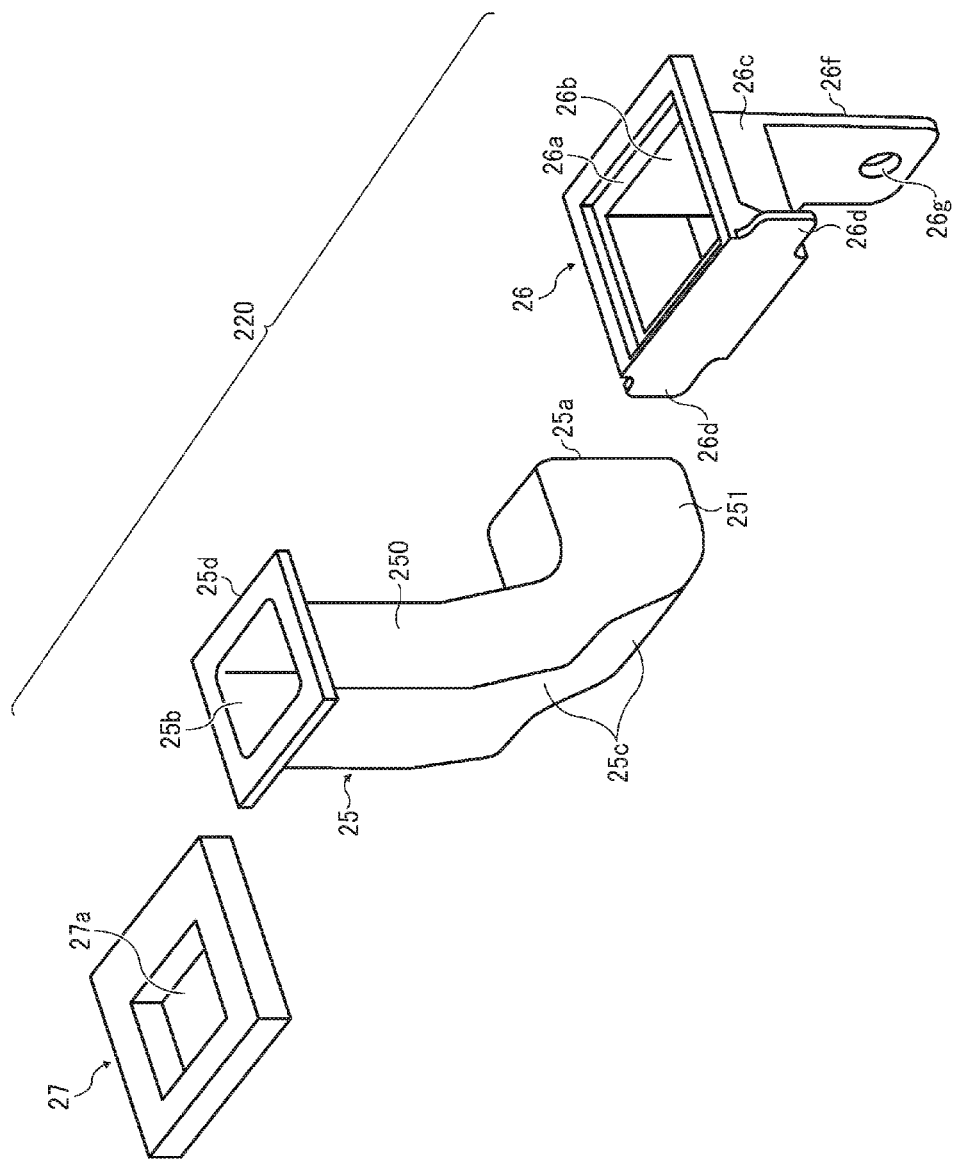
FIG. 7 is an exploded view of the flow passage.
Figure 8:
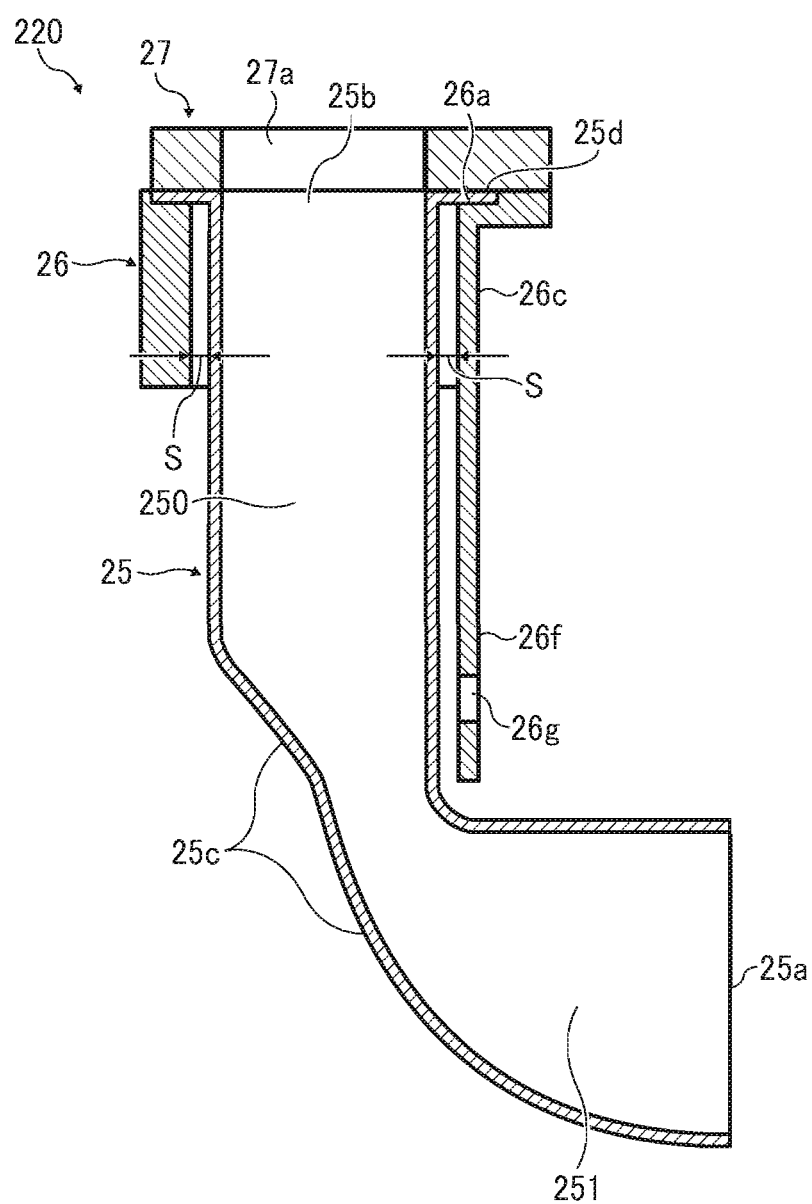
FIG. 8 is a schematic cross sectional view of the end side flow passage.

FIG. 6A is a perspective view of the end side flow passage 220, FIG. 6B is a side view of the end side flow passage 220, FIG. 6C is a front view of the end side flow passage 220, FIG. 6D is a rear view of the end side flow passage 220. FIG. 7 is an exploded view in which the end side flow passage 220 explodes each component, and FIG. 8 is a schematic cross-sectional view of the end side flow passage 220. As described below, the up-and-down direction, the front side direction and the rear side direction relating to each component of the end side flow passage 220 are expressed with a direction in a state in which the end side flow passage 220 is connected to the body side flow passage 221.

Referring to FIGS. 6A to 6D and FIG. 7, the end side flow passage 220 includes a flexible flow passage 25 which is connected to the body side flow passage 221, a holder 26 that holds the flexible flow passage 25 in the state in which the flexible flow passage 25 is connected to the body side flow passage 221, and a seal 27 which seals a clearance between the flexible flow passage 25 and the body side flow passage 221 so as to prevent air leakage in the state in which the flexible flow passage 25 is connected to the body side flow passage 221.

The seal 27 includes an opening 27a, used for ventilation, at a center thereof, and the opening 27a is formed by a thick ring-shaped member. The material of the seal 27 is an elastic material such as a sponge.

The flexible flow passage 25 includes a tube-shaped member whose thickness is smaller than that of the seal 27. The flexible flow passage 25 is made of an elastically deformable material having flexibility or bendability, such as a silicone, and thereby the flexible flow passage 25 is easily deformable. The flexible flow passage 25 includes an opening at both sides, one end (a lower opening) is a ventilation opening 25a to discharge the air from the blower fan 21, and another end (an upper opening) is a connection opening 25b connected to the body side flow passage 221. In other words, the flexible flow passage 25 of the end side flow passage 220 is to flow air from the ventilation opening 25a as a first opening to the connection opening 25b as a second opening.

The flexible flow passage 25 is bent (curved) between the ventilation opening 25a and the connection opening 25b. In other words, the flexible flow passage 25 includes a bent portion between the ventilation opening 25a and the connection opening 25b. The ventilation opening 25a and the connection opening 25b are disposed in an orthogonal or intersecting direction with respect to each other. The flexible flow passage 25 includes a vertical flow passage 250 extending downwardly from the connection opening 25b in the connected state to the body side flow passage 221, and a horizontal flow passage 251 extending in an attachment direction A (i.e., a horizontal direction) of the image forming unit as shown in FIG. 6B from a lower side of the vertical flow passage 250. The ventilation opening 25a is provided at the end of the horizontal flow passage 251. Thereby, in the state in which the flexible flow passage 25 is connected to the body side flow passage 221, the connection opening 25b is arranged facing in an upward direction, and the ventilation opening 25a is arranged facing toward a downstream side of the attachment direction A of the image forming unit. A thin portion whose flow passage width is locally thin is disposed between the vertical flow passage 250 and the horizontal flow passage 251.

An inclined portion 25c inclined relative to the attachment direction A of the image forming unit is provided in an outer surface of the flexible flow passage 25 and its surface faces toward an upstream side of the image forming unit, in other words, its surface faces toward the front side of the image forming apparatus 100. In this embodiment, although the inclined portion 25c is provided with an upper side inclined linearly and a lower side inclined curvilinearly which is connected to the upper side, a whole of the inclined portion 25c may be provided linear or curved. Referring in FIG. 7, the flexible flow passage 25 includes a flange 25d at a periphery of the connection opening 25b thereof, and the flange 25d is provided so as to protrude in an outer circumferential direction of the flexible flow passage 25. The flange 25d is a separation preventing part to prevent the flexible flow passage 25 from separating from the holder 26 in a state in which the flow passage 25 is attached to the holder 26 shown in FIGS. 6A to 6D.

On the other hand, a depression 26a in which the flange 25d of the flexible flow passage 25 is housed is provided in the holder 26. The holder 26 comprises a tube member including an insertion hole 26b into which the flexible flow passage 25 is inserted. The depression 26a is disposed around an opening of an upper surface of the holder 26. A depth of the depression 26a is set so as to prevent the flange 25d from protruding upward from the upper surface of the holder 26 in a state in which the flange 25d is housed.

The holder 26 includes a restrictor 26c to restrict a deformation of the flexible flow passage 25, whereby the restrictor 26c is arranged so as to cover an outer peripheral surface of a connection opening 25b side of the flexible flow passage 25 in the attached state to the flexible flow passage 25. The restrictor 26c is a tube portion provided so as to continuously surround the flexible flow passage 25 in all directions which include the front-and-rear sides and the right-and-left sides of the flexible flow passage 25. The whole holder 26 including the restrictor 26c is made of a material with rigidity higher than that of the flexible flow passage 25, such as polycarbonate (PC).

A pair of projecting pieces 26d projecting at both right-and-left sides is provided at a front side of the restrictor 26c. A locking part 26e locked to the apparatus main body is provided at each of the projecting piece 26d so as to protrude to the rear side, as shown in FIGS. 6B and 6D.

An attachment part 26f for attaching the flexible flow passage 25 to the apparatus main body is provided at the rear side of the restrictor 26c. The attachment part 26f extends downward from the restrictor 26c, and a lower end of the attachment part 26f is disposed near an upper side of the horizontal flow passage 251 of the flexible flow passage 25. An attachment hole 26g for receiving a screw as an attachment member is provided at the lower part of the attachment part 26f.

Figure 9A:
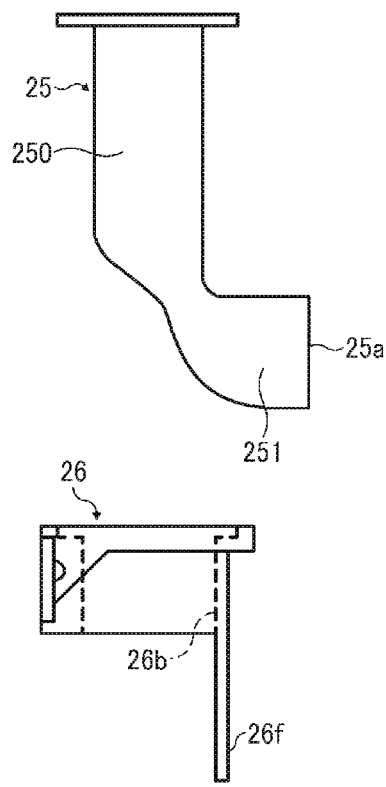
FIGS. 9A to 9D are schematic views of an assembly method of each component of the end side flow passage.

A description is next given of an assembling method for each of the components of the end side flow passage 220. A first step includes attachment of the flexible flow passage 25 with the holder 26. At this time, referring to FIG. 9A, before inserting the flexible flow passage 25 into the insertion hole 26b of the holder 26, a direction of the flexible flow passage 25 and the holder 26 are aligned in a predetermined direction. More specifically, the direction of the flexible flow passage 25 and the holder 26 are aligned so that a direction to which the ventilation opening 25a of the flexible flow passage 25 faces and a side at which the attachment part 26f of the holder 26 is arranged are directed in a same direction (right direction in FIG. 9A).

Figure 9B:
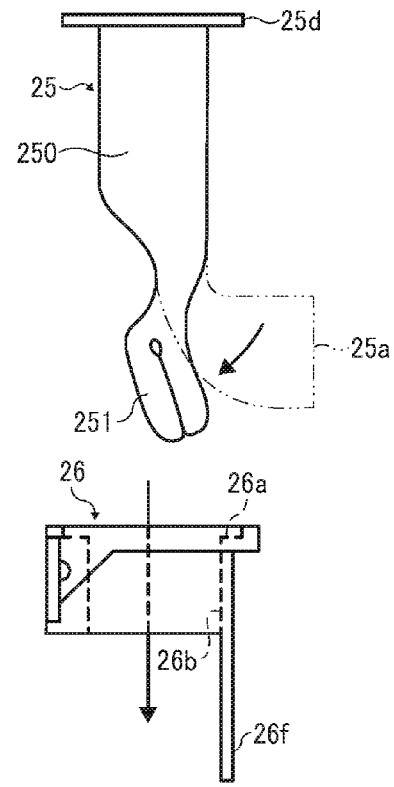

However, in leaving this state (the condition shown in FIG. 9A), when the flexible flow passage 25 is inserted into the insertion hole 26b, the flexible flow passage 25 is caught by the ventilation opening 26b or its surrounding portion. Thereby, as shown in FIG. 9B, the ventilation opening 26b or its surrounding portion is picked and deformed, for example by a person's fingers, and is directed toward a downward (insertion) direction. In this state, the flexible flow passage 25 is insertable into the insertion hole 26b of the holder 26.

Figure 9C:
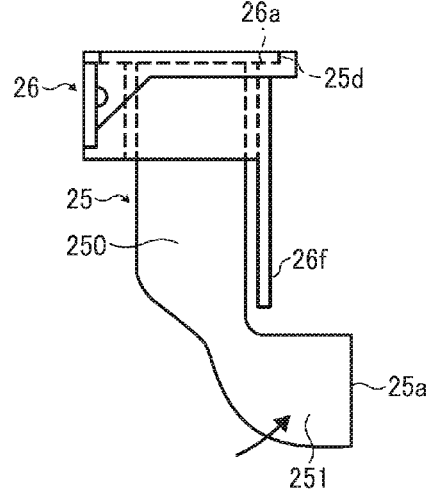

When the flexible flow passage 25 is inserted into the insertion hole 26b and the ventilation opening 25a or its surrounding portion passes over the end (lower end) of the attachment part 26f, by removing the person's fingers from the ventilation opening 25a or its surrounding portion as shown in FIG. 9C, the ventilation opening 25a or its surrounding portion is recovered to its original shape by an elastic return force. In addition, by contacting the flange 25d of the flexible flow passage 25 to a bottom face of the depression 26a of the holder 26, the flange 25d is adhered and fixed to the depression 26a through an adhesive member such as a double sided adhesive tape at the bottom face of the depression 26a applied beforehand.

Figure 9D:
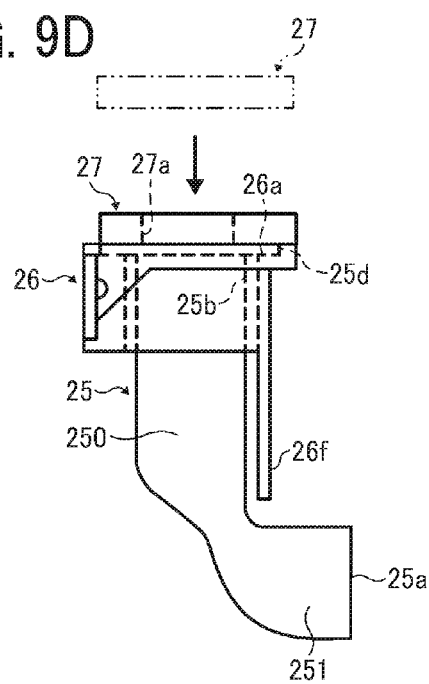

Finally, as shown in FIG. 9D, the seal 27 is disposed so as to contact an upper face of the holder 26. At this time, the opening 27a of the seal 27 is disposed so as to correspond to the connection opening 25b of the flexible flow passage 25. On the upper face of the holder 26, an adhesive member such as a double sided adhesive tape is applied beforehand, and thus the seal 27 is adhered and fixed to the upper face of the holder 26 through the adhesive member.

The assembly of the flexible flow passage 25, the holder 26, and the seal 27 are completed by performing the above processes. In a state in which each of the parts are assembled, detachment of the flexible flow passage 25 from the holder 26 is prevented because the flange 25d of the flexible flow passage 25 is sandwiched between the holder 26 and seal 27. In this embodiment, a width of the insertion hole 26b is larger than the connection opening 25b of the flexible flow passage 25 so as to easily insert the flexible flow passage 25 into the insertion hole 26b of the holder 26. Thereby, in the state of inserting and assembling the flexible flow passage 25 into the insertion hole 26b, there is a gap S between an inner peripheral surface of the insertion hole 26b and an outer peripheral surface of the flexible flow passage 25 that is opposite to the inner peripheral surface of the insertion hole 26b, as shown in FIG. 8. Accordingly, the flexible flow passage 25 is deformable between the gap S.

A description is next given of a mounting method of mounting the end side flow passage 220 to the body side flow passage 221. In this embodiment, the mounting operation of the end side flow passage 220 is performed through a front opening 110 of the apparatus main body which is provided for pulling the image forming units 1Y, 1C, 1M, and 1Bk out. In the state in which the image forming units 1Y, 1C, 1M, and 1Bk are inserted, it is impossible to perform the mounting operation because of interference from the image forming units 1Y, 1C, 1M, and 1Bk. Therefore, when the mounting operation is performed, a first step includes pulling out the image forming units 1Y, 1C, 1M, and 1Bk as shown in FIG. 2, and a next step includes detaching the image forming units 1Y, 1C, 1M, and 1Bk from the guide rails 16a, 16b, as shown in FIG. 3.

FIGS. 10A to 10D show the detailed flow of the mounting method of the end side flow passage 220. As shown in FIG. 10A, a connection port 221a of the body side flow passage 221 opening downward is provided at a portion to which the end side flow passage 220 is connected. A structure body 101 such as a frame or a housing is provided above a space into which each of the image forming units 1Y, 1C, 1M, and 1Bk is inserted. A notch 101a opened continuously from a lower side to a front side of the connection port 221a of the body side flow passage 221 and a screw hole 101b so as to fasten a screw for attaching the end side flow passage 220 are provided in the structure body 101.

For attaching the end side flow passage 220, as described above, in the state in which each of the image forming units 1Y, 1C, 1M, and 1Bk is pulled out and detached from the guide rails 16a, 16b, an insertion of the end side flow passage 220 from the front opening 110 to an inside of the apparatus main body is performed. At this time, the connection opening 25b of the flexible flow passage 25 is faced upward and the ventilation opening 25a is faced to the rear side of the apparatus main body (i.e., a downstream side in the insertion direction of the image forming unit) as show in FIG. 10A. In this facing direction, the end side flow passage 220 is lifted from a downward part of the structure body 110 and brought close to the body side flow passage 221 side through the notch 101a.

As shown in FIG. 10B, the connection opening 25b of the end side flow passage 220 and the connection port 221a of the body side flow passage 221 are connected. More specifically, the connection port 221a including its surrounding part (i.e., a connection part) is inserted into the connection opening 25b of the end side flow passage 220 and the opening 27a of the seal 27.

Figure 11:
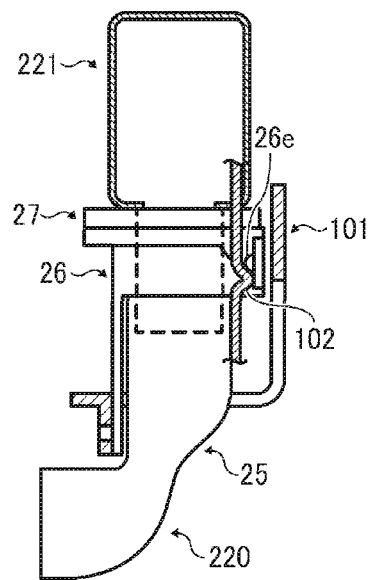
FIG. 11 is a schematic view in a state in which the end side flow passage is locked to the image forming apparatus.

As shown in FIG. 11, in a state in which the end side flow passage 220 is connected to the body side flow passage 221, the pair of locking parts 26e at the holder 26 is locked to a convex locking portion 102 at the apparatus main body. The end side flow passage 220 is then prevented from falling out from the body side flow passage 221 by locking the locking parts 26e with the convex locking portion 102. In addition, a purpose of this locking is not to completely fix the end side flow passage 220 to the apparatus main body but to temporarily hold it before the end side flow passage 220 is fixed to the apparatus main body.

Subsequently, the mounting operation of the end side flow passage 220 to the apparatus main body is performed. In this embodiment, the mounting of the end side flow passage 220 to the apparatus main body is performed by a screw. As shown in FIG. 10B, in the state in which the end side flow passage 220 is connected to the body side flow passage 221, both the attachment hole 26g for fastening the screw and the screw hole 101b are arranged at the rear side of the flexible flow passage 25. Thereby, in the state shown in the FIG. 10B, it is difficult to perform a fastening operation of the screw.

As shown in FIG. 10C, the flexible flow passage 25 is thus bent to the front side, the flexible flow passage 25 is retracted from the front side of the attachment hole 26g and the screw hole 101b, and thereby the attachment hole 26g and the screw hole 101b become visible. The flexible flow passage 25 may be retracted from the front side of the attachment hole 26g and the screw hole 101b by being bent toward not only the front side but also toward the left side or the right side. In the state of matching the attachment hole 26g with the screw hole 101b, a screw 28 is then inserted into these holes and fastens them. Thereby, the end side flow passage 220 is attached to the apparatus main body.

After the mounting operation of the end side flow passage 220 to the apparatus main body, the flexible flow passage 25 bent to the front side is returned to its original state as shown in FIG. 10D. Thereby, a series of the mounting operation of the end side flow passage 220 is completed. In addition, in this embodiment, although a head of the screw 28 fastened to the screw hole 101b is disposed in a protruding state to the front side of the attachment part 26f, an arrangement that the head of the screw 28 is within the gap S between the attachment part 26f and the flexible flow passage 25 prevents the flexible flow passage 25 from being deformed accidentally by the head of the screw 28. When the end side flow passage 220 is detached, it is possible to detach the end side flow passage 220 from the apparatus main body and the body side flow passage 221 by performing reversal of the above attachment process.

Figure 12:
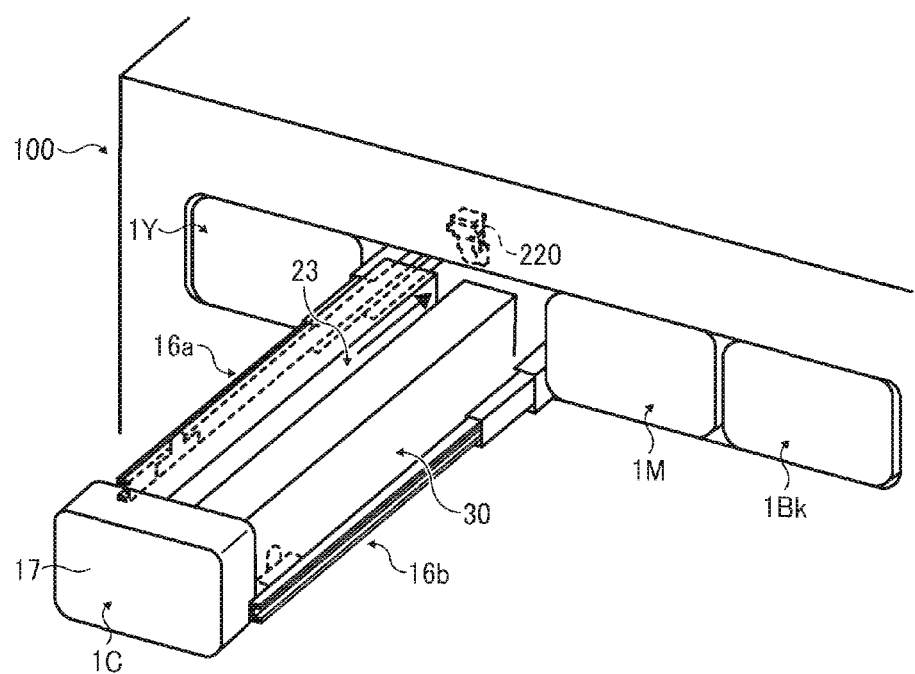
FIG. 12 is a schematic view of an inserting process of the image forming unit to the image forming apparatus in a state in which the end side flow passage is attached to the image forming apparatus.

As described above, in the attached state of the end side flow passage 220, as shown in FIG. 12, the image forming unit 1C is placed on the guide rails 16a, 16b and pushed to the rear side of the apparatus main body. In accordance with this pushing action, the end side flow passage 220 relatively passes through an inside of the recess portion 23 of the housing 30 of the image forming unit 1C. Thereby, it is possible to insert the image forming unit 1C into the apparatus main body and to dispose the end side flow passage 220 inside of the recess portion 23.

When the end side flow passage 220 passes through the inside of the recess portion 23, as shown in FIG. 13A, basically, the end side flow passage 220 does not interfere with an inner wall of the recess portion 23 because the end side flow passage 220 is disposed at a center of the recess portion 23 in a width direction. As shown in the FIGS. 13B and 13C, the inner wall of the recess portion 23 may contact the flexible flow passage 25 depending on the pushing action of the image forming units 1Y, 1C, 1M, and 1Bk to the apparatus main body. In this embodiment, as shown in FIG. 2, since the guide rails 16a, 16b are provided by connecting the plurality of guide rail members 161, 162 and 163, especially in an extended state of the guide rails 16a, 16b, support by the plurality of guide rail members 161, 163 and 163 becomes easily unstable. At a pushing operation start point and a pulling out operation finish point in which the guide rails 16a, 16b are extended, the inner wall of the recess portion 23 may contact the flexible flow passage 25 when the image forming units 1Y, 1C, 1M, and 1Bk swing in a left direction or a right direction.

However, the flexible flow passage 25 is made deformable (flexible) and the ventilation opening 25a side of the flexible flow passage 25 is not fixed. Thereby, even when the image forming units 1Y, 1C, 1M, and 1Bk contact the ventilation opening 25a side of the flexible flow passage 25, the flexible flow passage 25 is deformable in the right-and-left directions following the contact, as shown in the solid line in the FIGS. 13B and 13C. Therefore, the image forming units 1Y, 1C, 1M, and 1Bk are smoothly inserted into and detached from the apparatus main body without being caught by the flexible flow passage 25. In addition, when the flexible flow passage 25 returns to a normal position (the position shown in FIG. 13A) with no swinging, after the image forming units 1Y, 1C, 1M, and 1Bk swing in the right-and-left directions, the flexible flow passage 25 is elastically returned to its original shape.

Figure 14:
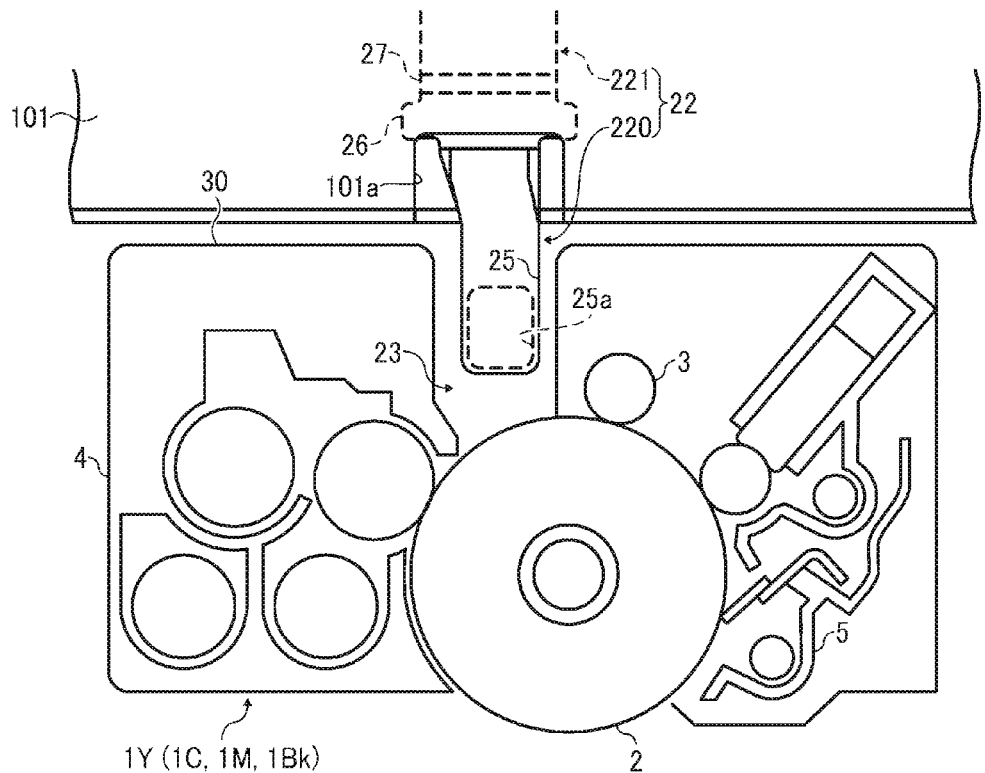
FIG. 14 is a schematic front view in a state in which the image forming unit is inserted into the image forming apparatus attached with the end side flow passage.

FIG. 14 shows the front view in the state which each of the image forming units 1Y, 1C, 1M, and 1Bk is inserted into the apparatus main body attached with the end side flow passage 220. As shown in FIG. 14, in this embodiment, in the state which the image forming units 1Y, 1C, 1M, and 1Bk are attached to the apparatus main body, at least a part of the flexible flow passage 25 including the ventilation opening 25a (i.e., the horizontal flow passage 251 or its surrounding portion) is disposed inside the recess portion 23 of the housing 30 of each of the image forming units 1Y, 1C, 1M, and 1Bk.

Accordingly, at least a part of the duct 22 is disposed inside the recess portion 23, and the recess portion 23 is effectively utilized as a mounting space of the duct 22. Thereby, it is possible to miniaturize the device. Especially in this embodiment, it is possible to decrease a height of the image forming unit and decrease the apparatus main body size compared to a structure in which apart of the duct is disposed above the marking module. In this embodiment, although the recess portion 23 is disposed at the upper surface of the image forming units 1Y, 1C, 1M, and 1Bk, the recess portion 23 may be disposed at a right side surface or a left side surface of the image forming units 1Y, 1C, 1M, and 1Bk, and a part of the duct 22 may be disposed inside the respective recess portion 23.

In this embodiment, when the image forming units 1Y, 1C, 1M, and 1Bk are attached to or detached from the apparatus main body, a part of the duct 22 which relatively passes through the inside of the recess portion 23 is provided by the flexible flow passage 25 that is deformable. Thereby, even when the image forming units 1Y, 1C, 1M, and 1Bk swing in a right-and-left direction and contact the inner wall of the recess portion 23, the image forming units 1Y, 1C, 1M, and 1Bk are smoothly attached to or detached from the apparatus main body by deforming the flexible flow passage 25. At the attachment and the detachment operations of the end side flow passage 220, since the attachment hole 26g and the screw hole 101b are easily visible by bending the flexible flow passage 25, the attachment and detachment operations are also easily performed.

In this embodiment, although an entirety of the flexible flow passage 25 is made of the elastic material, a part of the flexible passage may be made of the elastic material. It is also possible to provide deformability by using a bellow structure in at least a part of the flexible flow passage 25.

In this embodiment as described above, the end side flow passage 220 includes the flexible flow passage 25, and thereby it is possible to ease the interference of the image forming units 1Y, 1C, 1M, and 1Bk with the end side flow passage 220 in attaching and detaching the image forming units 1Y, 1C, 1M, and 1Bk and to improve visibility of the attachment hole 26g and the screw hole 101b. On the other hand, a connecting operation of the end side flow passage 220 to the body side flow passage 221 may be hard to perform because of the deformability of the flexible flow passage 25. Accordingly, in this embodiment, an outer peripheral part of the connection opening 25b side of the flexible flow passage is covered by the restrictor 26c that has a high rigidity. Thereby, when the end side flow passage 220 connects to the body side flow passage 221, it is possible to restrict a large deformation of the flexible flow passage 25 and to perform the connecting operation of the end side flow passage 220 stably. Furthermore, after connection, since the deformation of the flexible flow passage 25 is restricted by the restrictor 26c, the deformation of the flexible flow passage 25 at the connection opening 25b or its surrounding portion is suppressed even though the image forming units 1Y, 1C, 1M, and 1Bk contact the flexible flow passage 25 when the image forming units 1Y, 1C, 1M, and 1Bk are attached to or detached from the apparatus main body. Thereby, the possibility of disconnecting the end side flow passage 220 from the body side flow passage 221 is reduced by deforming of the flexible flow passage 25 at the connection opening 25b or its surrounding portion.

Figure 15:
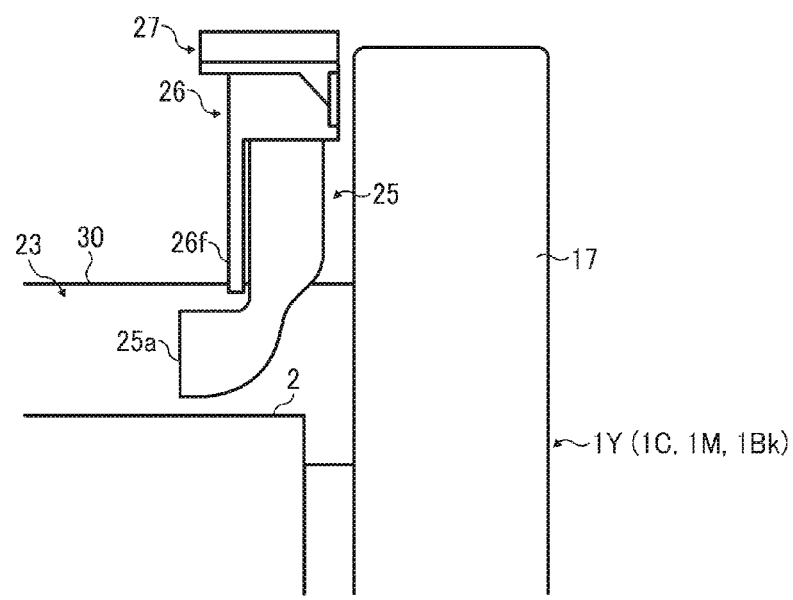
FIG. 15 is a schematic side view illustrating a relative position between an attaching portion of the duct and the concave portion of the image forming unit according to an embodiment.
Figure 16:
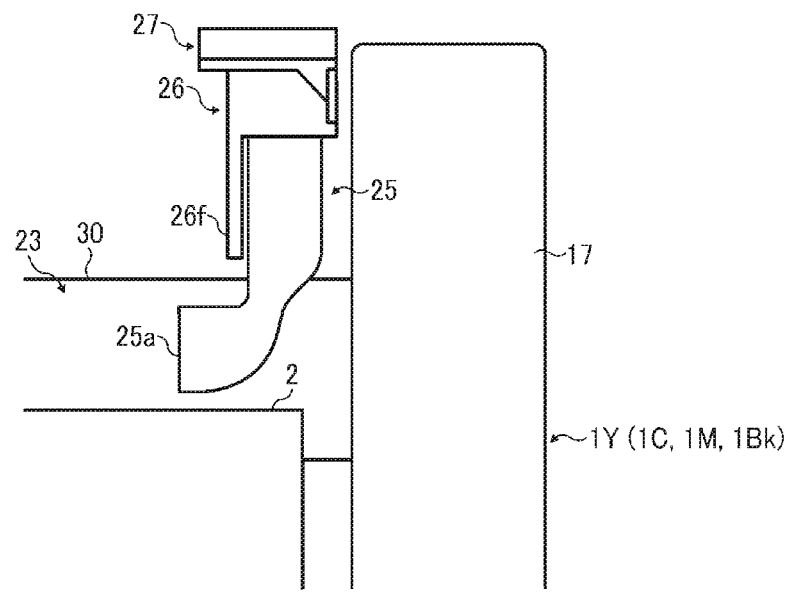
FIG. 16 is a schematic side view illustrating the relative position between the attaching portion of the duct and the concave portion of the image forming unit according to another embodiment.

As shown in FIG. 15, in this embodiment, a part of the flexible flow passage 25 and the end portion (i.e., lower end portion) of the attachment part 26f are arranged so as to be inserted inside the recess portion 23 of the image forming units 1Y, 1C, 1M, and 1Bk. On the other hand, as shown in FIG. 16, the end portion (lower portion in FIG. 16) of the attachment part 26f may be arranged so as to not be inserted inside the recess portion 23. By this arrangement of the attachment part 26f, shown as in FIG. 17, it is possible to prevent the attachment part 26f from contacting the image forming units 1Y, 1C, 1M, and 1Bk even though the image forming units 1Y, 1C, 1M, and 1Bk contact the flexible flow passage 25 when the image forming units 1Y, 1C, 1M, and 1Bk are attached to or detached from the apparatus main body. In other words, the end portion of the attachment part 26f is above an upper surface of the housing 30 of the image forming units 1Y, 1C, 1M, and 1Bk, and thereby it is possible to prevent the attachment part 26f from contacting an upper end portion (i.e., edge portion) of a downstream side of the housing 30 in the insertion direction.

Figure 17:
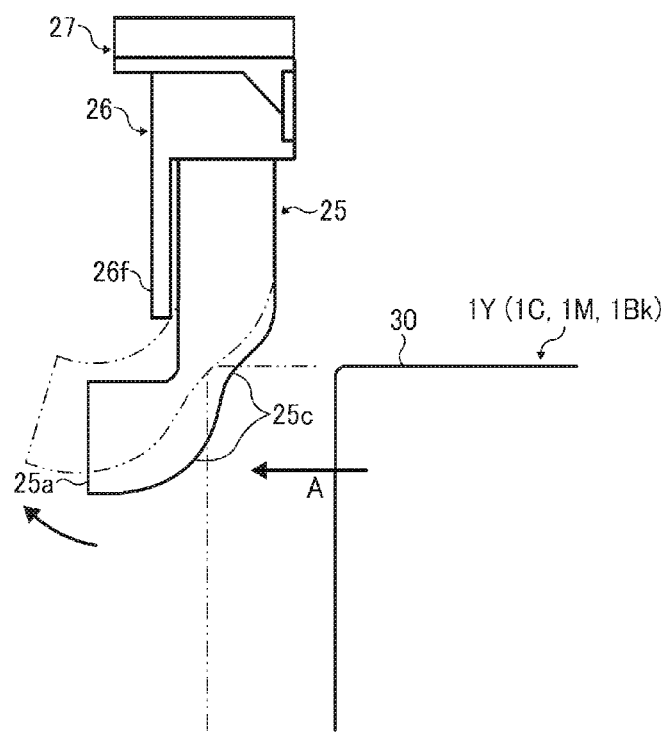
FIG. 17 is a schematic view to explain an action of the end side flow passage illustrated in FIG. 16.
Figure 18A:
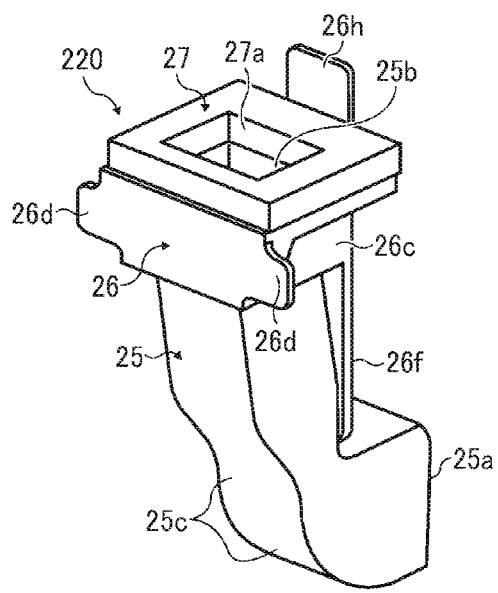
FIGS. 18A to 18D are schematic views of another embodiment of the end side flow passage.
Figure 18B:
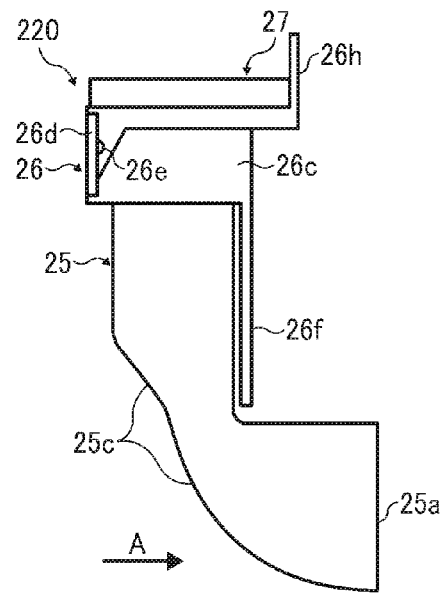
Figure 18C:
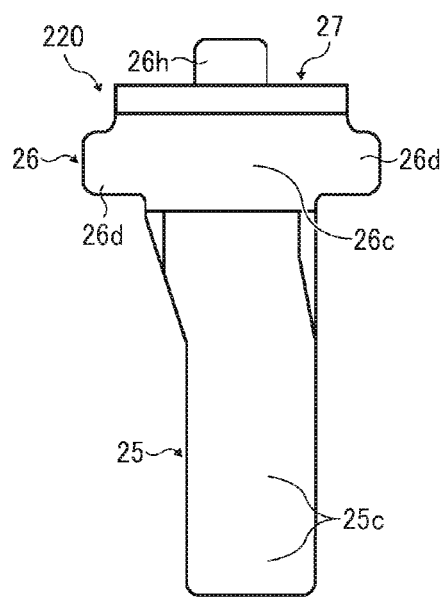
Figure 18D:
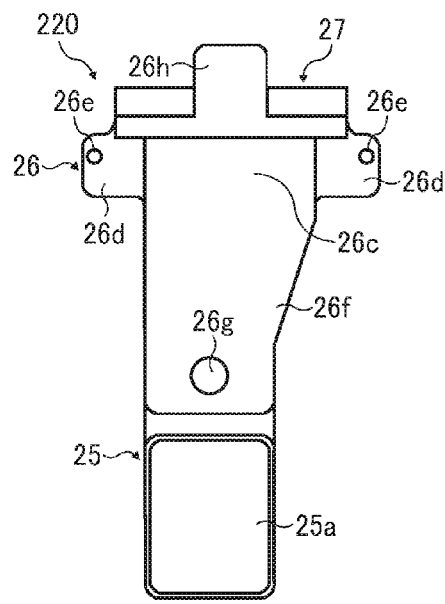

As shown in FIG. 17, the flexible flow passage 25 includes the inclined portion 25c. The inclined portion 25c opposes the upstream side of the image forming units 1Y, 1C, 1M, and 1Bk in the insertion direction A. Thereby, the image forming units 1Y, 1C, 1M, and 1Bk move so as to slide the inclined portion 25c even when the image forming units 1Y, 1C, 1M, and 1Bk contact the flexible flow passage 25. That is, because the image forming units 1Y, 1C, 1M, and 1Bk are hardly caught by the flexible flow passage 25, the insertion of the image forming units 1Y, 1C, 1M, and 1Bk is smoother. At this time, although the flexible flow passage 25 deforms as shown by a two-dot chain line in FIG. 17 by being pushed from the image forming units 1Y, 1C, 1M, and 1Bk, it is possible to restrict this deformation by the end portion of the attachment portion 26f. Thereby, the possibility of disconnecting the end side flour passage 220 from the body side flow passage 221 is reduced by restricting the deformation of the connection opening 25b side (i.e., upper end side) of the flexible flow passage 25. Furthermore, it is possible to reduce a load on the restrictor 26c by receiving the deformed flexible flow passage 25 at the attachment portion 26f.

Second Embodiment

FIGS. 18A to 18D show a second embodiment of the duct. In the second embodiment shown in FIGS. 18A to 18D, the end side flow passage 220 includes a protrusion 26h as a release portion protruding upward. The other features of the end side flow passage 220 of the second embodiment are similar to those of the above-described first embodiment.

In the present embodiment, the protrusion 26h is provided so as to extend upward from the upper portion of the rear side of the holder 26. In the present embodiment, although the protrusion 26h is integrally formed with the holder 26, the protrusion 26h may be separately formed with the holder 26. In addition, an end portion (upper end portion) of the protrusion 26h is arranged so as to protrude upward farther than an upper surface of the seal 27.

Figure 19A:
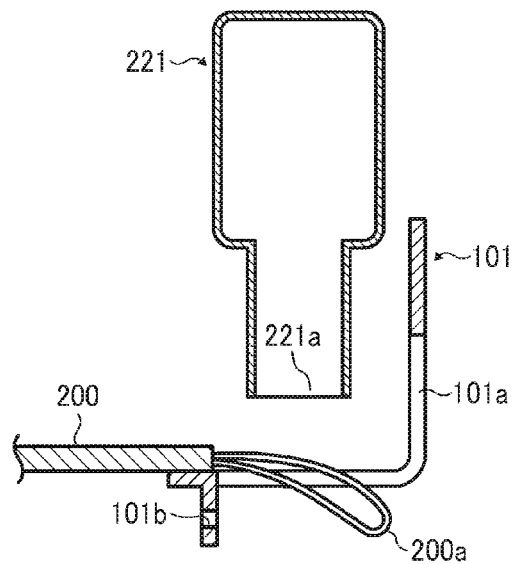
FIGS. 19A and 19B are schematic views of the end side flow passage illustrated in FIG. 18 which is contacted by a body side flow passage and its peripheral structure.
Figure 19B:
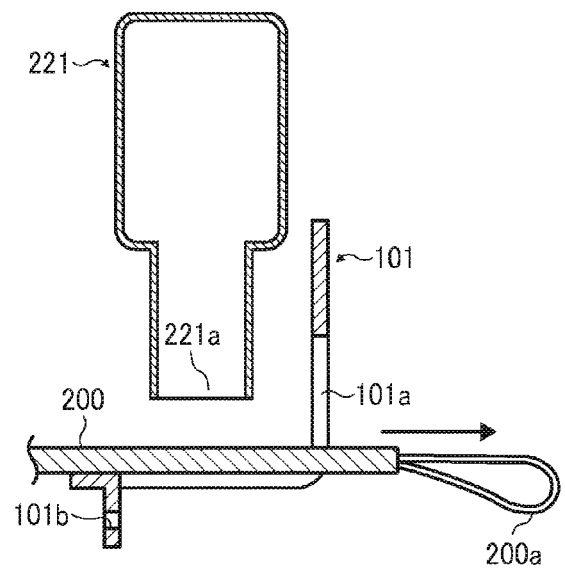

FIGS. 19A and 19B show the body side flow passage 221 and its surrounding portion to which the end side flow passage 220 is connected. As shown in FIG. 19A, in the present embodiment, a dustproof glass 200 for preventing adhesion of foreign substances is attached to the structure body 101 of the apparatus main body. The dustproof glass 200 is detachably attached to the structure body 101 so as to clean foreign substances adhered thereon. More specifically, when a loop-shaped holding portion 200a which is made by a flexible film, for example, and disposed at an end portion of the dustproof glass 200 is grabbed by a person's finger, for example, and pulled out to the front side as shown in FIG. 19B, the dustproof glass 200 is pulled out through the notch 101a. On the other hand, the dustproof glass 200 is attached to the structure body 101 by pushing the dustproof glass 200 to the rear side through the notch 101a.

In the present embodiment, as shown in FIGS. 19A and 19B, when the dustproof glass 200 is attached to the apparatus main body, the holding part 200a is arranged below the connection opening 221a of the body side flow passage 221. In this state, there is a possibility that the flow passage is closed because the holding part 200a is caught between the body side flow passage 221 and the end side flow passage 220 when the end side flow passage 220 is attached to the body side flow passage 221. Thereby, in the present embodiment, the protrusion 26h is provided.

The following description is about a function of the protrusion 26h during the connecting operation of the end side flow passage 220. As shown in FIG. 20A, when the end side flow passage 220 is brought close to the body side flow passage 221 side for connection, as shown in FIG. 20B, the protrusion 26h contacts the holding part 200a of the dustproof glass 200, and the holding part 200a is pushed up while being bent by the protrusion 26h. Furthermore, when the end side flow passage 220 is moved upward (in the connection direction) while being spaced so that the protrusion 26h does not interfere with the body side flow passage 221, as shown as FIG. 20C, the holding part 200a gets out from a clearance between the protrusion 26h and the body side flow passage 221 toward the dustproof glass 200 side (a left side in FIG. 20C). Thereby, the holding part 200a is moved from a first position where the holding part 200a is interposed between the end side flow passage 220 and the body side flow passage 221 to a second position where the holding part 200a is not interposed between the end side flow passage 220 and the body side flow passage 221. In the state in which the holding part 200a is completely retracted from the clearance between the end side flow passage 220 and the body side flow passage 221, the end side flow passage 220 is attached to the body side flow passage 221. The attachment operation of the end side flow passage 220 to the apparatus main body after this is similar to the attachment operation of the above-described first embodiment.

As described above, in the present embodiment, it is possible that the holding part 200a is moved to the retracted position from the clearance between the end side flow passage 220 and the body side flow passage 221 (i.e., a position not interposed between the end side flow passage 220 and the body side flow passage 221) during the connecting operation of the end side flow passage 220 by the protrusion 26h of the end side flow passage 220. Thereby, since the holding part 200a is not caught between the body side flow passage 221 and the end side flow passage 220, it is possible to prevent the flow passage from being blocked.

In the present embodiment, although the holding part 200a of the dustproof glass 200 is an example of an interference that is interposed between the end side flow passage 220 and the body side flow passage 221, it is similarly possible to retract other interferences between the end side flow passage 220 and the body side flow passage 221 by pressing the protrusion 26h to the other interferences. In the present embodiment, since the other structures are similar to those of the above described embodiment, the explanation is omitted.

In these embodiments, although this application applies to the blower duct in order to discharge ozone and the discharge products to the outside of the apparatus main body, this application also applies to a blower duct in order to cool the device and the members, or to a duct leading air flow for another purpose. In addition, although the unit including the recess portion in which the duct relating to this application is disposed applies to the above image forming unit, the unit may also apply to other attachment/detachment units, such as a fixing unit or a paper feeding unit. Furthermore, this application applies to an inkjet type image forming apparatus or to any other type of image forming apparatus.

Numerous additional modifications and variations are possible in light of the above teachings. It is therefore to be understood that, within the scope of the appended claims, the disclosure of this patent specification may be practiced otherwise than as specifically described herein. Additionally, effects of the embodiments mentioned above are simply examples of preferable effects, and effects attained by various aspects of this specification are not limited thereto.

What is claimed is:

1. A duct that is detachable to a main body, the duct comprising:
    a flow passage to flow air, the flow passage including a flexible structure; and
    a ventilation opening at a first end of the flow passage, wherein
    the ventilation opening and at least a part of the flow passage are passable through a recess of a detachable device which is detachable from the main body, and the ventilation opening and at least the part of the flow passage are passable through the recess in an insertion direction of the detachable device into or out of the main body while the detachable device is being inserted into or out of the main body.

2. The duct according to claim 1, wherein the flow passage includes an inclined structure which is inclined relative to the insertion direction of the detachable device into the main body, and the inclined structure is disposed at a position through which the detachable device passes when the detachable device is inserted into the main body.

3. The duct according to claim 1, wherein the flow passage includes:
    a connection opening at a second end of the flow passage, to connect to a body side flow passage of the main body, and
    a bent structure between the ventilation opening and the connection opening.

4. The duct according to claim 3, wherein the second end of the flow passage is fixed to the main body, and the first end of the flow passage is not fixed to the main body.

5. The duct according to claim 3, wherein a facing direction of the ventilation opening and a facing direction of the connection opening intersect each other.

6. The duct according to claim 1, further comprising:
    a holder to hold the flow passage; and
    a seal to seal an interface between the flow passage and a body side flow passage of the main body to which the flow passage is connected.

7. The duct according to claim 6, wherein the flow passage includes a flange, and the flange is disposed between the holder and the seal.

8. The duct according to claim 1, further comprising:
    a restrictor to cover an outer peripheral surface of the flexible structure.

9. The duct according to claim 1, further comprising:
    an attachment structure to attach the flow passage to the main body, wherein
    the attachment structure is opposed to a downstream side of the flow passage in the insertion direction of the detachable device into the main body.

10. A main body comprising:
    the duct according to claim 1;
    the detachable device that is attachable to and detachable from the main body; and
    an airflow generation device which generates a flow of the air inside a recess of the detachable device when the detachable device is attached to the main body.

11. A duct that is detachable to a main body, the duct comprising:
    a flow passage to flow air, the flow passage including a flexible structure;
    a ventilation opening at a first end of the flow passage; and
    a protrusion, which protrudes in an attachment direction of the duct into the main body, and which is disposed to contact an interfering structure interposed between the flow passage and a body side flow passage of the main body, wherein
    the ventilation opening and at least a part of the flow passage are passable through a recess of a detachable device which is detachable from the main body.

12. A duct that is attachable to a main body, the duct comprising:
    a flow passage to flow air, the flow passage including a flexible structure;
    a ventilation opening at a first end of the flow passage; and
    a connection opening at a second end of the flow passage, the connection opening including a facing direction that intersects with a facing direction of the ventilation opening, wherein
    the ventilation opening and at least a part of flow passage are passable through a recess of a detachable device which is detachable from the main body, and the ventilation opening and at least the part of the flow passage are passable through the recess in an insertion direction of the detachable device into or out of the main body while the detachable device is being inserted into or out of the main body.

13. The duct according to claim 12, further comprising:
    an attachment structure to attach the duct to the main body, wherein
    an attachment direction of the attachment structure is in a same direction as the facing direction of the ventilation opening.

14. A main body comprising:
    the duct according to claim 12;
    the detachable device that is attachable to and detachable from the main body; and
    an airflow generation device which generates a flow of the air inside a recess of the detachable device when the detachable device is attached to the main body.

15. A main body comprising:
    a detachable device that is attachable to and detachable from the main body; and
    a duct that is attachable to and detachable from the main body, wherein
    at least a part of the duct is at a recess of the detachable device, and at least the part of the duct is passable through the recess in an insertion direction of the detachable device into or out of the main body while the detachable device is being inserted into or out of the main body.

16. The main body according to claim 15, wherein the duct is at a front side of the main body, which the detachable device is inserted into, and at least the part of the duct relatively passes through the recess when the detachable device is attached to the main body.

17. The main body according to claim 15, wherein the duct includes a flexible structure, and the flexible structure is at the recess.

18. The main body according to claim 15, wherein the main body is of an image forming apparatus, and at least the part of the duct is disposed above a photoconductor and adjacent to a charger.

19. The main body according to claim 15, wherein the duct includes a vertical flow passage and a horizontal flow passage, the vertical passage is connected to the main body, and the horizontal flow passage includes an opening which faces toward the insertion direction of the detachable device into the main body.

20. The main body according to claim 15, wherein the duct includes an inclined structure, and the detachable device contacts the inclined structure when the detachable device is attached to the main body.

* * * * *